_(12)_ United States Patent
McDearmon (10) Patent No.: US 6,658,943 B2
(45) Date of Patent: Dec. 9, 2003

(54) BEARING ASSEMBLY WITH SENSORS FOR MONITORING LOADS

(75) Inventor: Graham F. McDearmon, North Canton, OH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 10/099,447

(22) Filed: Mar. 15, 2002

(65) Prior Publication Data

US 2002/0092360 A1 Jul. 18, 2002

Related U.S. Application Data

(63) Continuation-in-part of application No. 09/547,129, filed on Apr. 10, 2000.

(51) Int. Cl.[7] ................................................. G01N 3/00
(52) U.S. Cl. ........................................ 73/795; 73/862.55
(58) Field of Search ................................. 73/795, 118.1, 73/862.55, 865.9, 493, 660, 661; 384/448, 459

(56) References Cited

U.S. PATENT DOCUMENTS

| | | | | |
|---|---|---|---|---|
| 4,642,500 A | * | 2/1987 | Higuchi et al. ............ 310/90.5 |
| 5,140,849 A | * | 8/1992 | Fujita ........................ 73/118.1 |
| 5,488,871 A | * | 2/1996 | Harbottle et al. ......... 73/862.55 |
| 5,952,587 A | * | 9/1999 | Rhodes et al. .......... 73/862.541 |
| 6,158,124 A | * | 12/2000 | Austin ...................... 29/898.09 |
| 6,161,962 A | * | 12/2000 | French et al. ................ 384/459 |

* cited by examiner

Primary Examiner—Edward Lefowitz
Assistant Examiner—Octavia Davis
(74) Attorney, Agent, or Firm—Polster, Lieder, Woodruff & Lucchesi (57) ABSTRACT

A bearing assembly which couples a road wheel to a suspension system component on an automotive vehicle includes a hub to which the wheel is attached and a housing which is attached to the suspension system component. The housing has two tapered raceways which surround raceways on cones that are fitted to the hub. Organized in two rows between the raceways of the housing and cones are tapered rollers which roll along the raceways when the wheel rotates. The rollers as they pass over the outer raceway impart minute flexures to the housing and these flexures are monitored by multiple strain sensors on the housing. The strains—and the signals produced by the sensors—reflect conditions at the region of contact between a tire on the road wheel and the road surface over which the tire rolls. When the bearing assembly is used in industrial applications, such as rolling mills or machine tools, the electrical signals generated by the sensors provide indications usable by electronic processors and controllers which analyze these signals to determine the loads placed upon various components within a system which incorporates the bearing assembly.

32 Claims, 4 Drawing Sheets

BEARING ASSEMBLY WITH SENSORS FOR MONITORING LOADS

CROSS-REFERENCE TO RELATED APPLICATIONS

This is a Continuation-In-Part of application Ser. No. 09/547,129 filed Apr. 10, 2000.

STATEMENT REGARDING FEDERALLY SPONSORED RESEARCH OR DEVELOPMENT

Not applicable.

BACKGROUND OF THE INVENTION

This invention relates in general to bearings and, more particularly, to a bearing assembly which monitors forces and torques transmitted through it to provide electrical signals for use by devices which monitor and control vehicular dynamics based upon calculated tire patch loading or to determine the general stresses, strains, and loads placed upon a bearing.

There are a number of applications where the loads and types of loads placed on a bearing in operation can provide significant information about the bearing and the objects attached to the bearing. One such application is in the automotive industry where such loading information, in electrical signal form, is vital for the proper application of Vehicular Dynamic Control ("VDC") systems. Another application is in the steel rolling mill industry where electronic processing and control is used to manipulate the speed and torque of rollers during the rolling process. Yet another application is the machine tool industry where programmable controllers and processors monitor and control the speed of spindles in milling, cutting, and drilling machines.

In the automotive industry, many vehicles of current manufacture come equipped with antilock braking systems. A system of this type monitors the rotation of the wheels on a vehicle and, when the brakes of the vehicle are applied, relaxes the braking force at any wheel which locks up and skids. This reduces the tendency of the vehicle to veer off course when the traction at the wheels differs and makes the vehicle easier to steer under such circumstances. A few vehicles have traction control systems. This type of system monitors the rotation of driven wheels and distributes the tractive effort between those wheels, so that one does not break loose and spin. While both systems enable the driver of a vehicle to maintain better control over the vehicle, other factors influence the operation of the vehicle and, notwithstanding the successful operation of an antilock braking system and a traction control system, those other factors may still cause a vehicle to go out of control.

Significant among those other factors are the centrifugal forces encountered by a vehicle when it negotiates a turn—forces which act laterally on the vehicle. The friction between the vehicle tires and the road surface, that is at the so-called "tire contact patches", resists these forces, but sometimes the friction may not be enough and the vehicle will slide, and perhaps go out of control, particularly if operated by one having poor driving skills. Then again, the frictional forces at the tire contact patches may prevent sliding, but the centrifugal force generated by the turn, inasmuch as it acts at the center of gravity, which is above the tire contact patches, may be sufficient to topple the vehicle.

Automobile manufactures have turned to VDC systems to prevent automobiles from going out of control in turns. The typical VDC system relies on a yaw sensor which measures the rate of change in yaw (rotation of the vehicle about its vertical axis) and a lateral acceleration sensor to, in effect, measure the centrifugal force imposed on the vehicle as a consequence of negotiating the turn. A VDC system also takes into account the angular velocity of the road wheels, the position of the steering wheel, and the power delivered by the engine. The typical VDC system analyzes the information and modulates the operation of the engine, as well as the brakes, to better maintain control of the vehicle in the turn.

The more sophisticated VDC systems also factor into the real time analysis estimated loads at the individual wheels and thus seek to evaluate conditions at the tire contact patches. But when negotiating a turn, each tire contact patch experiences forces and torques that do not comport with simple analytical procedures. Thus, measuring the displacement of a shock absorber piston, for example, does not give a very reliable indication of conditions that exist at the tire contact patch below that shock absorber. Certainly, it provides no indication of the torque at the tire contact patch, much less of the location at which the resultant of the force at the tire contact patch is acting.

Bearing assemblies exist which incorporate the use of strain gages to provide certain information regarding various bearing loads. For example, an antifriction rolling bearing disclosed in U.S. Pat. No. 5,140,849 issued Aug. 25, 1992, uses two strain gages to monitor the general loads applied to a bearing. This bearing, however, is unable to provided the multi-faceted data needed by high level VDC electronic systems or by the processor controlled systems in the rolling mills industry or the machine tool industry.

U.S. Pat. No. 4,748,844 discloses a load detection device more related to the automotive industry. That device consists of a multi-component load cell structure fixed to a hub on which a road wheel is mounted, the load cell structure being attached so as to rotate with the tire of the wheel. While that device provides some signal benefits, this device cannot provide signals indicating all loads and all torques required to enable a high level VDC electronic device to function properly. In particular, that device mounts all of its strain gages in only one plane which is perpendicular to the axis about which the wheel rotates. As a result, the signals from the strain gages on that device are unable to detect the forces tending to cause a vehicle to skid sideways or to roll the vehicle over.

Therefore, while the automotive industry is continuing to develop electronic devices which assist the driver to maintain control of his vehicle through various combinations of brake application and continuous suspension adjustment, the more sophisticated of these systems require reliable input signals indicating the full spectrum of loading which are indicative of the loads exerted at the tire contact patch.

Similarly, the rolling mill and machine tool industry utilize various forms of process controls which require monitoring of the loads placed on bearings. Specifically, rolling mills need bearing feedback regarding indications of belt slipping on rollers or indications that a particular set of rollers is experiencing higher loads and torques. Computer controlled machine tools need to monitor the amount of torque being experienced by a bearing supporting a spindle in order to assess whether cutting and drilling tools have become dull or whether the cutting or drilling speeds exceed the limits established for proper machining operations.

SUMMARY OF THE INVENTION

The present invention resides in a bearing assembly that couples a road wheel to a suspension system component on an automotive vehicle. The bearing assembly includes a hub to which the road wheel is attached and a housing which is attached to the suspension system component. The hub rotates in the housing on rolling elements which are arranged in two rows, with each row being between opposed raceways on the hub and housing. The rolling elements impart minute flexures to the housing, and the flexures are detected by strain sensors attached to the housing. In one embodiment the sensors are located at 90° intervals around each raceway of the housing. In another they are on a flange at which the housing is attached to the suspension system component. In still another they are located along an intervening surface that lies between the two raceways of the housing. The invention also resides in the bearing assemblies of the several embodiments apart from a wheel and suspension system component. Additionally, the present invention resides in a bearing assembly equipped with strain sensors used to generate electrical signals of a type and mode which are usable by various types of electronic processing and controlling devices which require such electrical signals to calculate loads within the mechanical system in which the bearing is incorporated.

The invention also resides in the method of using strain sensors to generate electrical signals of a type and mode which are usable by other automotive devices which function to provide dynamic control of a vehicle under various loading conditions, or by other electronic devices in the rolling mill industry or the machine tool industry.

DETAILED DESCRIPTION

Referring now to the drawings, a road wheel W (FIG. 1), which supports an automotive vehicle on a road surface, experiences several forces F and torques T when the wheel W rolls along the road surface. First there is the vertical force $F_v$ which generally represents the weight of the vehicle and any inertial forces generated by irregularities in the road surface and by braking. The wheel W also experiences horizontal forces $F_h$ which act generally in the direction the wheel is headed. Also, there are thrust loads $F_t$, which are forces directed axially, that is in the direction of the axis X of rotation. Then there is the vertical torque $T_v$, that is to say, torque about an axis passing vertically through the wheel W and sometimes referred to as the steering torque. Finally, horizontal torque $T_h$, sometimes referred to as the overturning moment, which acts about an axis passing horizontally through the wheel W in the direction of advance for the wheel W. Altogether the current invention measures the loads for five degrees of freedom which include three forces, $F_v$, $F_h$, and $F_t$, and two moments, $T_v$ and $T_h$.

Figure 1:
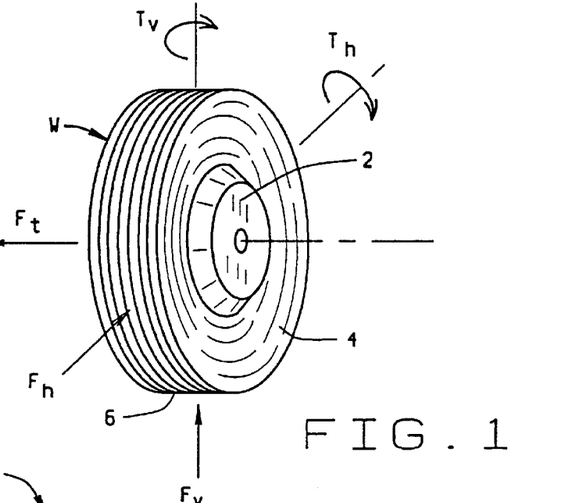
FIG. 1 is a perspective view of a road wheel showing the several forces and torques that act on it.

The wheel W has a rim 2 and a tire 4 mounted on the rim 2. The tire 4 contacts the road surface along a tire contact patch 6, where the tire 4 experiences the forces F and torques T. The magnitude of the forces and torques indicate conditions at the tire contact patch 6 and, when evaluated with other conditions in real time, provide a good representation of the capacity of the vehicle to remain under control, or, on the other hand, go out of control.

The wheel W is coupled to a component C (FIG. 2) of the suspension system for the vehicle at a bearing assembly A which enables the wheel W to rotate about the axis X while transferring loads between the wheel W and suspension system component C. Typically, the suspension system component C is a steering knuckle. The bearing assembly A includes a hub 12 to which the wheel W is attached, a housing 14 which is secured to the suspension system component C, and a bearing 16 which is located between the hub 12 and housing 14 and enables the hub 12 to rotate on the housing 14 with minimal friction. To accommodate the housing 14, the suspension system component C is provided with a through bore 18 and a machined end face 20. For the most part, the housing 14 fits partially into the bore 18 and against the end face 20. The bearing 16 is contained within the housing 14. The hub 12 extends into the bearing 16 where it is confined both axially and radially.

Figure 2:
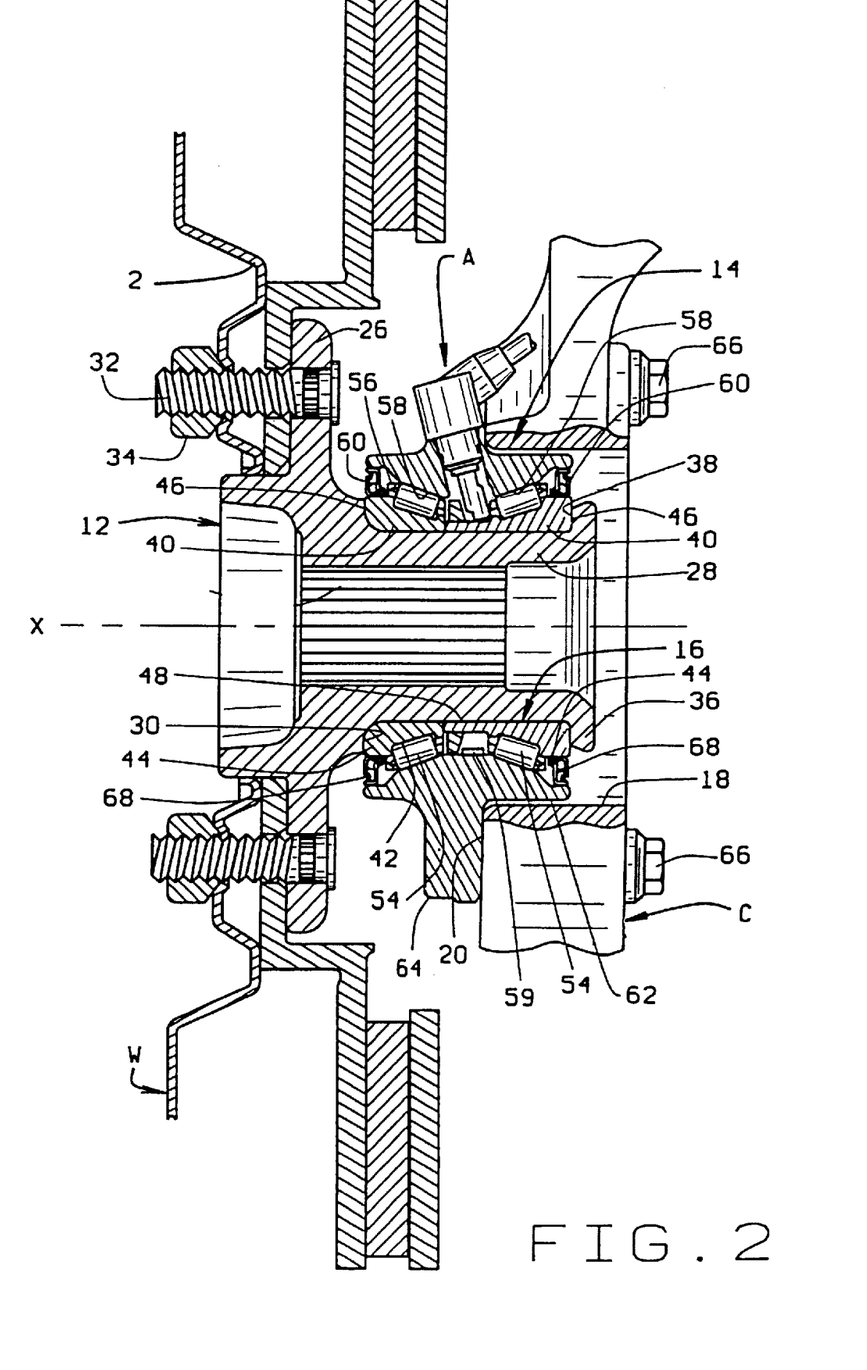
FIG. 2 is a sectional view of a bearing assembly constructed in accordance with and embodying the present invention.

More specifically, the hub 12 includes a flange 26 and a hollow spindle 28 which projects from the flange 26 at a shoulder 30 located on the back face of the flange 26. Outwardly from the shoulder 30, the flange 26 is fitted with lug bolts 32 which project axially from its other face and pass through the rim 2 of the road wheel W. Beyond the wheel W, lug nuts 34 are threaded over the bolts 32 to secure the wheel W to the hub 12.

At its end remote from the flange 26, the spindle 28 is upset, that is, deformed outwardly in the provision of a formed end 36 having an abutment face 38 that lies perpendicular to the axis X and is presented toward the shoulder 30. The bearing 16 is captured between the shoulder 30 on the flange 26 and the face 38 of the formed end 36.

The bearing 16 includes an inner race in the form of two cones 40 which fit around the spindle 28, there being an interference fit between each cone 40 and the spindle 28. Each cone 40 has a tapered raceway 42 that is presented outwardly away from the axis X, a thrust rib 44 at the large end of its raceway 42, and a back face 46, which is squared off with respect to the axis X on the end of the thrust rib 44. The inboard cone 40 is somewhat longer than the outboard cone 40 by reason of a cylindrical cone extension 48 which projects beyond the small end of its raceway 42. The cone extension 48 may serve as a seat for a target wheel that is monitored by a speed sensor in the housing 14. The inboard cone 40 at its cone extension 48 abuts the small end of the outboard cone 40 along the spindle 28, that is to say, the two cones 40 abut at their front faces. The back face 46 of the outboard cone 40 abuts the shoulder 30 that lies along the flange 16, whereas the back face 46 of the inboard cone 40 abuts the end face 38 on the formed end 36.

In addition to the cones 40, the bearing 16 includes tapered rollers 54 arranged in two rows, there being a separate row around each cone 40. Actually, the rollers 54 extend around the raceways 42 for the cones 40, there being essentially line contact between the tapered side faces of the rollers 54 and the raceways 42. The large end faces of the rollers 54 bear against the thrust ribs 46. The rollers 54 of each row are essentially on apex, which means that the envelopes in which their tapered side faces lie have their apices located at a common point along the axis X. Each row of rollers 54 has a cage 56 to maintain the proper spacing between the rollers 54 in that row.

The housing 14 surrounds the spindle 28 as well as the two cones 40 and the two rows of rollers 54. It forms part of the bearing 16 in that is has tapered raceways 58 which are presented inwardly toward the axis X. In that sense, the housing 14 constitutes the outer race of the bearing 16. The raceways 58 on the housing 14 taper downwardly toward a cylindrical intervening surface 59 which separates them. The rollers 54 likewise lie along the raceways 58 of the housing 14, there being essentially line contact between the raceways 58 and the tapered side faces of the rollers 54. At their large ends, the raceways 58 open into short end bores 60 in which the thrust ribs 44 of the two cones 40 are located. Thus, each end of the bearing 16 has an annular space, with that space being between the thrust rib 44 at that end and the surrounding surface of the end bore 60.

The housing 14 has an exterior surface 62 that is generally cylindrical and also a triangular or rectangular flange 64 that projects from the surface 62 generally midway between its ends. In the region behind the flange 64, the diameter of the surface 62 is slightly less than the diameter of the through bore 18 in the suspension system component C. This portion of the housing 14 fits into the bore 18 with some clearance, while the back face of the flange 64 bears against the end face 20 on the component C. The housing 14 is secured firmly to the component C with bolts 66 that pass through the latter and thread into the flange 64 on the former.

The annular spaces at the ends of the bearing 16 are closed with seals 68 which fit into the end bores 60 of the housing 14 and around the thrust ribs 44 of the cones 40. U.S. Pat. No. 5,022,659 discloses suitable seals for both locations.

The formed end 36 unitizes the assembly A. But the hub 12 does not always have the formed end 36. Initially, the spindle 28 of the hub 12 extends from the shoulder 30 all the way to its free end as a cylindrical surface. The two cones 40, with their complements of rollers 54 and with the housing 14 captured between the rollers 54 of the two rows, are installed over the cylindrical surface of the spindle 28 and advanced until the back face 46 of the outboard cone 40 comes against the shoulder 30 at the other end of the spindle 28. When the cones 40 are so positioned, a portion of the spindle 28 projects beyond the back face 46 of the inboard cone 40. This portion is deformed into the formed end 36. PCT application GB 98/01823 (International Publication No. WO98/58762) discloses a rotary forming process for upsetting the initially extended end of the spindle 28 and converting that end into the integral formed end 36 which in effect unitizes the entire assembly A.

Other means may secure the two cones 40 on the spindle 28 as well. For example, the end of the spindle 28 may have threads and a nut engaged with those threads and turned down against the back face 46 of the inboard cone 40.

When the assembly A is so unitized, its bearing 16 exists in a condition of slight preload. Actually the spacing between the inner raceways 42 on the cones 40 determines the setting of the bearing 16, and that spacing depends on the length of the cone extension 48 for the inboard cone 40, inasmuch as the rotary forming procedure which produces the formed end 46 drives the inboard cone 40 toward the outboard cone 40 with enough force to cause the cone extension 48 on the former to abut the small end of the latter. A nut threaded over the spindle 28 and turned down snugly against the back face 46 of the inboard cone 40 will have the same effect.

The forces $F_v$, $F_h$ and $F_t$ and the torques $T_v$ and $T_h$ which act upon the wheel W reflect conditions at the tire contact patch 6. For example, a balanced thrust load $F_t$ will reflect travel in a straight line and will represent somewhat more than the preload in the bearing 16. On the other hand, a larger unbalanced thrust $F_t$, that is more in one direction than the other, will indicate a turn or perhaps a significant inclination of the vehicle to one side or the other. An increase in the vertical force $F_v$ will reflect a turn or the application of brakes if the wheel W is at the front of the vehicle.

Figure 5:
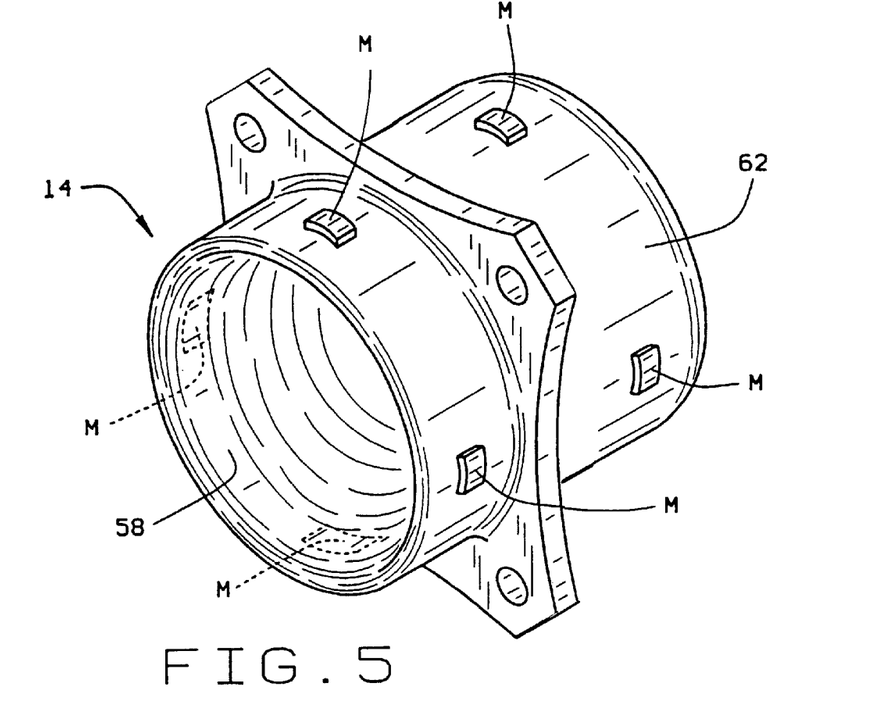
FIG. 5 is a perspective view of the housing for the bearing assembly.

The forces $F_v$, $F_h$, $F_t$ and the torques $T_v$ and $T_h$ which the wheel W experiences are transferred to the suspension system component C through the bearing assembly A, so the bearing assembly A experiences those forces F and torques T as well. The forces F and torque T manifest themselves in minute expansions and contractions of the housing 14, and these minute expansions and contractions are detected at sensor modules M (FIG. 5) which are attached to the exterior surface 62 of the housing 14 immediately outwardly from both its raceways 58. Actually, the tapered rollers 54 transfer the forces F and torques T from the cones 40 to the housing 14 and as they roll along the raceways 58, impart the expansions and contractions in the bearing 16. Those expansions and contractions transfer to the exterior surface 62 and to the locations of the sensors M along that surface 62.

In one embodiment, each sensor module M includes (FIGS. 3 & 4) a strain gage 70 that basically consists of a carrier matrix 72 and two foil resistance elements 74 and 76. It should be noted that while the description of this embodiment describes the use of bonded resistance strain gauge sensors which operate by changing resistance values, other types of strain sensors such as mechanical sensors, photoelectric sensors, optical sensors, capacitance sensors, inductance sensors, and semiconductor sensors are also equally suitable. In this embodiment, however, the carrier matrix 72 is formed from a suitable polymer, such as polyimide, that itself is capable of expanding and contracting with the housing 14. It is bonded to the exterior surface of the housing 14 with a suitable adhesive. Each foil resistance element 74 and 76 is formed from a suitable metal foil, such as constantan foil, which is bonded to the carrier matrix 72 such that it experiences the same expansions and contractions as the matrix 72. Each resistance element 74 and 76 has several parallel legs 78 and end loops 80 connecting the ends of the adjacent legs 78. The outermost legs 78 terminate at tabs 82. The elements 74 and 76, while both being on the matrix 72, are electrically isolated from each other. Moreover, the legs 78 of the element 74 are oriented at 90° with respect to the legs 78 of the element 76. The resistance of each leg 78 varies when it undergoes the expansions and contractions experienced by the carrier matrix 72, and the resistance of each element 74 and 76 undergoes an even greater change in resistance, inasmuch as it consists of multiple legs 78 connected in series. The matrix 72 electrically isolates the elements 74 and 76 from the metal housing 14, yet transmits the minute expansions and contractions of the housing 14 to the legs 78 of the elements 74 and 76.

Figure 3:
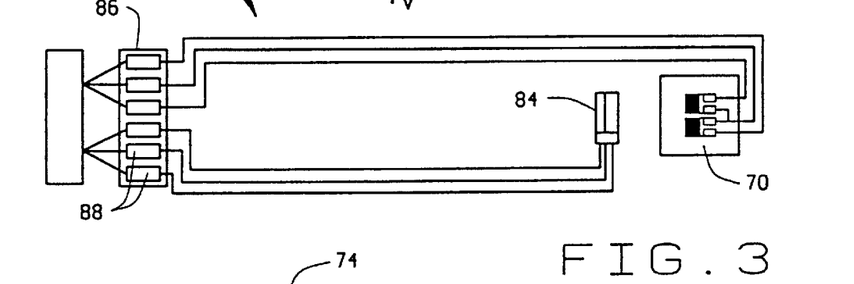
FIG. 3 is a plan view of one of the sensor modules for the bearing assembly.
Figure 4:
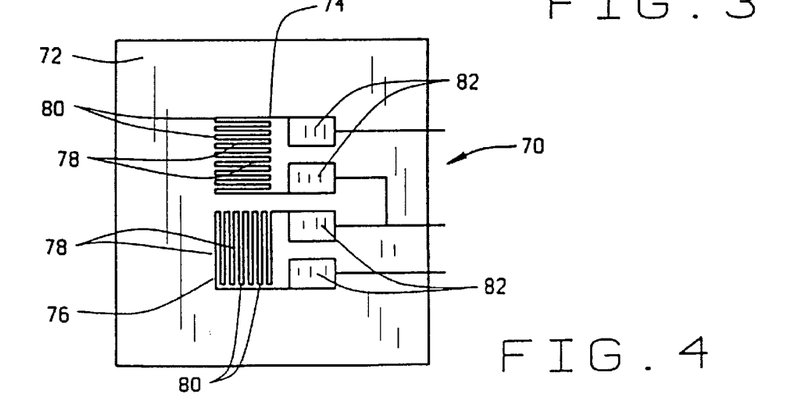
FIG. 4 is a plan view of a sensor for the sensor module of FIG. 3.

In addition to its sensor 70, each sensor module M includes a temperature compensator 84 and a terminal block 86. The temperature compensator 84 should operate at the same temperature as the sensor 70, and to this end, should be located on the housing 14 adjacent to the sensor 70, even on the carrier matrix 72 of the sensor 70. In this regard, the resistances of the resistance elements 74 and 76 not only vary with expansions and contractions of the matrix 72, but also with temperature. The temperature compensator 84 is connected to the resistance elements 74 and 76, either through a bridge circuit or through a processor, such that it compensates or offsets changes in the resistances of the elements 74 and 76 attributable to temperature variations. Thus, the signals derived from the resistance elements 74 and 76 reflect only variations in strain. The terminal block 86 contains terminals 88 to which the tabs 82 on the resistance elements 74 and 76 are connected and to which the temperature compensator 84 is likewise connected, all through leads. The terminals 88 are in turn connected to a processor for evaluating and processing the signals produced by the resistance elements 74 and 76 and the temperature compensator 84.

Four sensor modules M are attached to the exterior surface 62 of the housing 14 radially outwardly from the outboard raceway 58 and they are arranged at 90° intervals, (FIG. 5) one being with its sensor 70 at the top of the surface 62, another with its sensor 70 at the bottom of the surface 62 and the other two with their sensors 70 at the sides of the surface 62. The remaining four sensor modules M are also attached to the exterior surface 62, but they are located radially outwardly from inboard raceway 58. They too are located at 90° intervals, with their sensors 70 being at the top, bottom and sides of the surface 62. In other words, the sensors 70 are arranged in two rows, with the sensors in each row being located 0°, 90°, 180°, and 270°, 0° being top center. In each of the sensors 70 of the eight modules M, the legs 78 of the resistance element 74 for that sensor 70 extend circumferentially, whereas the legs 78 of the element 76 extend axially with respect to the bearing housing 14.

When the road wheel W rolls over a road surface and carries the suspension system component C with it—as well as the entire vehicle of which the component C is a part—the spindle 28 of the hub 12 rotates in the housing 14. The cones 40 of the bearing 16, being fitted to the spindle 28 with an interference fit, likewise rotate. The tapered rollers 54 of the outboard row roll along the raceway 42 of the outboard cone 40 and the outboard raceway 58 of the housing 14. The tapered rollers 54 of the inboard row roll along the raceway 42 of the inboard cone 40 and the inboard raceway 58 of the housing 16. As the rollers 54 roll between their respective raceways 42 and 58 they transfer radial loads between the cones 40 and the housing 14. The radial load exerted by any roller 54 against the outer raceway 58 along which it rolls causes the housing 14 to flex minutely, and this flexure, while existing at the raceway 58, transfers through the housing 14 to the exterior surface 62 and manifests itself as a slight circumferential, and somewhat smaller, axial elongation of the surface 62 radially outwardly from the line of contact between the roller 54 and the raceway 58. Thus, each time a loaded roller 58 passes between a sensor 70 and the axis X, the flexure that occurs along its raceway 58 is transmitted to the exterior surface 62 at the sensor 70 where it elongates the parallel legs 78 of the resistance element 74 for sensor 70 and increases the resistance of the resistance element 76. The magnitude of the change in resistance depends on the load, for a roller which bears against its raceway 58 with a heavy force will impart a greater flexure than one which bears with a lesser force. By comparing the flexure—and thus the roller loads—reflected in the signals from the sensors 70, one can ascertain conditions at the tire patch 6 in real time.

Figure 6:
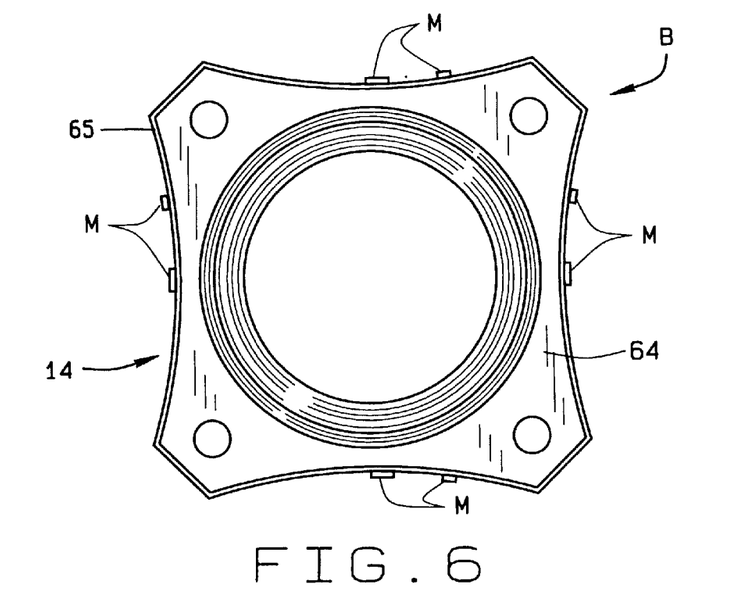
FIG. 6 is an end view of a housing for a modified bearing assembly.
Figure 7:
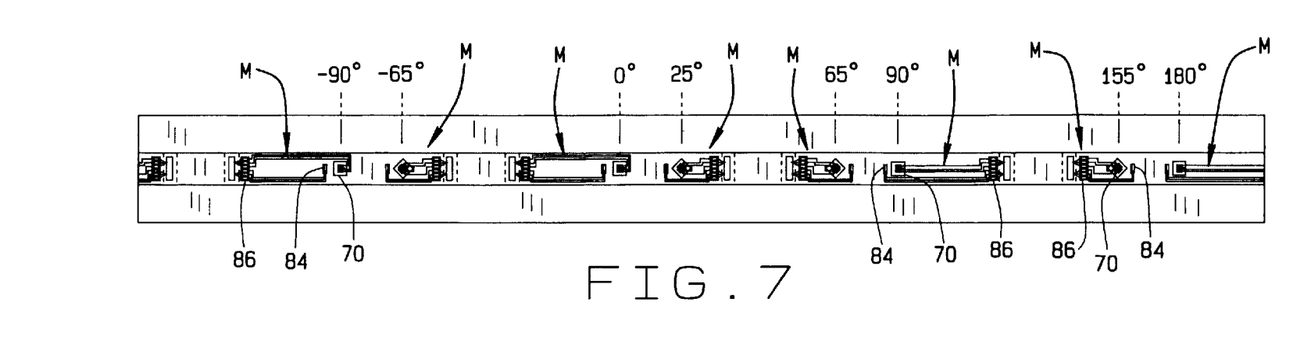
FIG. 7 is an expanded view showing the sensor modules of the modified bearing assembly in a single plane.

A modified bearing assembly B (FIG. 6) is the same as bearing assembly A in all respects, except the location and orientation of the sensors 70 for the eight sensor modules M. The bearing assembly B has its sensor modules M located along and attached to the outside flange surface 65 of the flange 64 of the housing 14. FIG. 7 shows an unfolded view of the positions and orientations of the sensors 70 along the outside flange surface 65. Four of the sensor modules M have their sensors 70 located at 0°, 90°, 180°, and 270° around the outside flange surface 65, with the very top of the outside flange surface 65 being 0°. These sensors 70 have the legs 78 of their resistance elements 74 extended circumferentially and the legs 78 of their resistance elements 76 extended axially with respect to the housing. The remaining four sensor modules M have their sensors 70 located at 25°, 65°, 155°, and 295° from top center, measuring forwardly and then around. The legs 78 of the resistance elements 74 and 76 in the remaining sensors 70 are oriented at 45° with respect to the circumferential direction and likewise 45° with respect to the axial direction.

Figure 8:
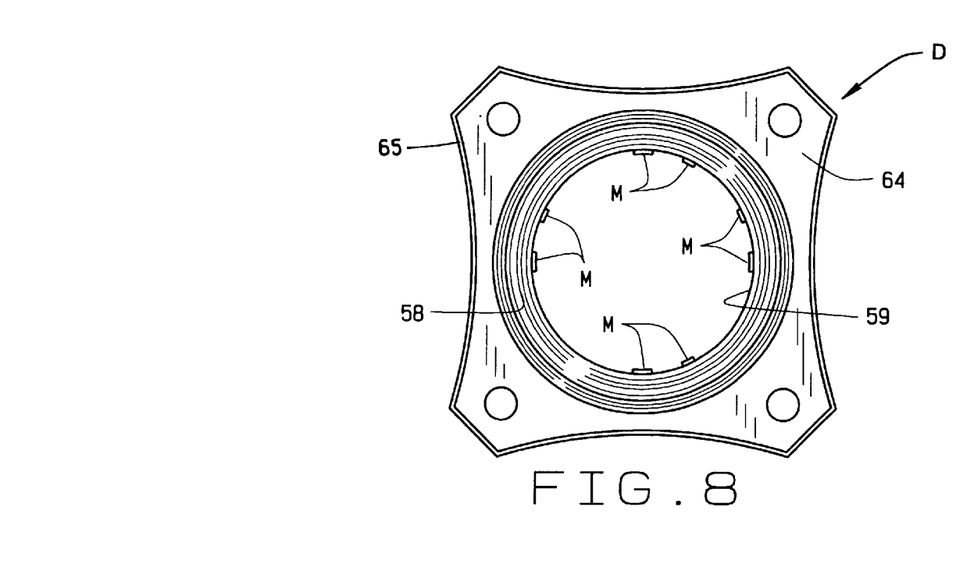
FIG. 8 is an end view of a housing for another modified bearing assembly.

Another modified bearing assembly D (FIG. 8) also resembles the bearing assembly A in every respect except the location of the sensors 70 for the eight sensor modules M. The bearing assembly D has its sensor modules M located along and attached to the intervening surface 59 that lies between the two raceways 58 of the housing 14. FIG. 7 shows an unfolded view of the positions and orientations of the sensors 70 along the surface 59. Four of the sensor modules M have their sensors 70 located at 0°, 90°, 180°, and 270° around the surface 59, with the very top of the surface 59 being 0°. These sensors 70 have the legs 78 of their resistance elements 74 extended circumferentially and the legs 78 of their resistance elements 76 extended axially with respect to the housing. The remaining four sensor modules M have their sensors 70 located at 25°, 65°, 155° and 295° from top center, measuring forwardly and then around. The legs 78 of the resistance elements 74 and 76 in the remaining sensors 70 are oriented at 45° with respect to the circumferential direction and likewise 45° with respect to the axial direction. In short, the location of the sensors 70 along the intervening surface 59 corresponds to the location of the sensors 70 along the flange surface 65 of the bearing assembly B, and basically, the same holds true with respect to the orientation of the resistance elements 74 and 76 of the sensors 70 (FIG. 7).

Another embodiment resembles the bearing assembly A in every respect except there is no road wheel W, rim 2, or hub 12. Instead, the bearing assembly A is mounted to any rotating shaft installation and the bearing sensors are thereafter used to provide electrical signals indicative of the circumferential, circumferential-axial, axial torque, and shear strains on the bearing generally. Examples of applications which would need such information are process controls for rolling mills and process controls for machine tools. It will be obvious to one skilled in the art of bearing design and bearing use that there are many other applications wherein the loading sustained by a bearing would require the use of a bearing capable of providing electrical signals for monitoring those bearing loads.

What is claimed is:

1. In combination with an automotive road wheel and an automotive suspension system component, a bearing assembly for coupling the road wheel to the suspension system component so that the road wheel can rotate relative to the suspension system component about an axis of rotation while providing monitoring capabilities for bearing loading, said bearing assembly comprising:

a hub including a flange and a spindle projecting from the flange, with its axis being the axis of rotation, the spindle having first and second inner raceways on it, with the raceways being presented outwardly away from the axis;

a housing surrounding the spindle of the inner race and having first and second outer raceways presented inwardly toward and surrounding the first and second raceways, respectively;

rolling elements arranged in first and second rows between the first and second raceways, respectively, and contacting the raceways to transfer both radial and axial loads between the housing and spindle; and at least four first strain sensors located on the housing to measure circumferential strains and circumferential strains less axial strains, the at least four sensors being located on the housing such as to provide a series of signals, the signals being capable of providing information allowing the calculating of loads for at least four degrees of freedom.

2. The combination according to claim 1 wherein one of the sensors being at the top of the housing, another at the bottom of the housing and others at the sides of the housing; the wheel being attached to the flange of the hub and the housing being attached to the suspension system component, whereby the bearing assembly couples the road wheel to the suspension system component and monitors forces transferred between the wheel and suspension system component.

3. The combination according to claim 2 wherein the first sensors located at the top, bottom and sides of the housing are oriented to detect strains in the circumferential direction in the housing.

4. The combination according to claim 3 wherein the first sensors are located on the housing around one of the outer raceways; and wherein the combination further comprises four second strain sensors located on the housing around the second outer raceway, with one of the second sensors being at the top of the housing, another at the bottom of the housing and the others at the sides of the housing.

5. The combination according to claim 4 wherein the raceways are tapered and the rolling elements are tapered rollers.

6. The combination according to claim 2 wherein the housing has a flange which projects outwardly, wherein the bearing assembly is attached to the suspension system component at the flange, and wherein the first sensors are located on the flange.

7. The combination according to claim 6 wherein the first sensors are oriented to detect strain in the circumferential direction; and additional sensors attached to the flange and being offset circumferentially from the first sensors, the additional sensors being oriented to detect strains oblique to the circumferential direction.

8. The combination according to claim 7 wherein the additional sensors are oriented at a 45 degree angle with respect to the circumferential direction of the housing.

9. The combination according to claim 7 wherein one of the additional sensors is located between the top first sensor and one of the side first sensors, another of the additional sensors is located between the top first sensor and the other side first sensor; and still another of the additional sensors is located between one of the side sensors and the bottom sensor.

10. The combination according to claim 9 where yet another additional sensor is located between the top first sensor and one of the side first sensors so that two additional sensors are located between the top sensor and said one side sensor.

11. The combination according to claim 2 wherein the housing has an intervening surface located between the outer raceways, and the first sensors are located on the intervening surface.

12. The combination according to claim 11 wherein the first sensors are oriented to detect strains in the circumferential direction; and wherein the combination further comprises additional sensors attached to the intervening surface and being offset circumferentially from the first sensors, the additional sensors being oriented to detect strains oblique to the circumferential direction.

13. The combination according to claim 12 wherein the additional sensors are oriented at a 45 degree angle with respect to the circumferential direction of the housing.

14. The combination according to claim 12 wherein one of the additional sensors is located between the top first sensor and one of the side first sensors, another of the additional sensors is located between the top first sensor and the other side first sensor; and still another of the additional sensors is located between one of the side sensors and the bottom sensor.

15. The combination according to claim 14 wherein yet another additional sensor is located between the top first sensor and one of the side first sensors, so that two additional sensors are located between the top sensor and said one side sensor.

16. A bearing assembly for facilitating rotation about an axis and the monitoring of bearing loads, said bearing assembly comprising:

an inner race having first and second inner raceways presented outwardly away from the axis;

a housing surrounding the inner race and having first and second raceways presented inwardly toward and surrounding the first and second inner raceways, respectively; first rolling elements arranged in a row between and contacting the first raceways and second rolling elements arranged in a row between and contacting the second raceways, whereby the inner race will rotate with minimal friction in the outer races and the rolling elements will roll along the raceways;

first sensors located around the housing radially outwardly from the first outer raceway to detect strains in the housing outwardly from the first outer raceway;

second sensors located around the housing radially outwardly from the second outer raceway to detect strains on the housing outwardly from the second outer raceway; and the at least four sensors being located on the housing such as to provide a series of signals, the series of signals being capable of providing information allowing the calculating of loads for at least four degrees of freedom.

17. A bearing assembly according to claim 16 wherein first and second sensors are attached to the housing at the top of the housing, more first and second sensors are attached to the housing at the bottom of the housing, and still more first and second sensors are attached to the housing at the sides of the housing.

18. A bearing assembly according to claim 17 wherein the sensors are oriented to detect strains in the circumferential direction.

19. A bearing assembly according to claim 17 wherein the sensors are oriented to detect oblique strains.

20. A bearing assembly according to claim 17 wherein the sensors are oriented to detect circumferential strains less axial strains.

21. A bearing assembly for facilitating rotation about an axis and the monitoring of loads; said bearing assembly comprising:

an inner race having first and second inner raceways presented outwardly away from the axis;

a housing surrounding the inner race and having first and second raceways presented inwardly toward and surrounding the first and second inner raceways, respectively;

first rolling elements arranged in a row between and contacting the first raceways and second rolling elements arranged in another row between and contacting the second raceways, whereby the inner race will rotate with minimal friction in the outer race and the rolling elements will roll along the raceways; and sensors attached to the housing outwardly from the outer raceways to detect strains in the housing, each sensor having an axis along which it is sensitive to dimensional changes, some of the sensors being oriented with their axes extended in the circumferential direction to detect strains in that direction, and others of the sensors being oriented with their axis oblique to the circumferential direction to detect oblique strains, the sensors being located on the housing such as to provide a series of signals, the series of signals being capable of providing information allowing the calculating of loads for at least four degrees of freedom.

22. A bearing assembly according to claim 21 wherein the sensors are arranged in a circumferentially extending row.

23. A bearing assembly according to claim 22 wherein the housing has a flange which ends outwardly, and the sensors are on the flange.

24. A bearing assembly according to claim 23 wherein the housing has an intervening surface between the outer raceways, and the sensors are on the intervening surface.

25. A method of evaluating the conditions that exist at a tire contact patch between a tire of a road wheel and a road surface, comprising the following steps:

a. attaching a road wheel to a hub having a spindle that rotates about an axis and in a housing that is attached to a suspension system component of an automotive vehicle, the spindle having first and second inner raceways on it, with the raceways being presented outwardly away from the axis and inclined in opposite directions with respect to the axis, the housing having first and second outer raceways that surround the first and second inner raceways, respectively, there being first rolling elements located in a row between the second raceways, so that when rotation is imparted to the wheel, the first and second rolling elements will roll along the first and second raceways, respectively;

b. monitoring the strains in the housing at multiple locations;

c. measuring strains in the housing at multiple locations;

d. emitting signals related to the strains measured; and e. calculating the loads for five degrees of freedom, said calculations being made based on the strains measured.

26. The method according to claim 25 further comprising the step of monitoring the strains which are in the circumferential, axial, and oblique direction from the axis.

27. The method according to claim 26 further comprising the step of monitoring the strains in the circumferential, axial, and oblique direction from the axis by detecting signals from at least four sensors located at a top of the housing, at a bottom of the housing, and at each side of the housing.

28. The method according to claim 26 further comprising the step of monitoring the strains in the circumferential, axial, and oblique direction from the axis by detecting signals from at least four sensors located on a flange surface of the housing at a top of the flange surface, at a bottom of the flange surface, and at each side of the flange surface.

29. The method according to claim 26 further comprising the step of monitoring the strains in the circumferential, axial, and oblique direction from the axis by detecting signals from at least four sensors located at a top edge of a flange of the housing, at a bottom edge of the flange of the housing, and at each side edge of the flange of the housing.

30. The method according to claim 25 further comprising the step of monitoring the strains in the circumferential, axial, and oblique direction from the axis by detecting signals a series of sensors located in a single row around the housing.

31. The method according to claim 25 further comprising the step of monitoring the strains from a series of sensors located along an intervening surface that lies between the first and second outer raceways.

32. The method according to claim 25 further comprising the step of monitoring the strains from a series of sensors located on the housing, said series of sensors being oriented at a 45 degree angle with respect to the circumferential direction of the housing.

* * * * *